United States Patent [19]

Walters et al.

[11] Patent Number: 5,012,635
[45] Date of Patent: May 7, 1991

[54] MODULAR CUTTERBAR FOR ROTARY MOWER

[75] Inventors: James C. Walters; Craig A. Richardson; Michael J. Verhulst, all of Ottumwa, Iowa

[73] Assignee: Deere & Company, Moline, Ill.

[21] Appl. No.: 531,605

[22] Filed: Jun. 1, 1990

[51] Int. Cl.⁵ .............................................. A01D 34/44
[52] U.S. Cl. ............................................ 56/13.6; 56/6
[58] Field of Search ............... 56/6, 255, 295, DIG. 6, 56/13.6; 74/413, 421 R

[56] References Cited

U.S. PATENT DOCUMENTS

| | | | |
|---|---|---|---|
| 4,302,921 | 12/1981 | Weber | 56/13.6 |
| 4,601,162 | 7/1986 | Wessel | 56/6 X |
| 4,693,061 | 9/1987 | Koch et al. | 56/13.6 |
| 4,922,693 | 5/1990 | Neuerburg | 56/13.6 |

Primary Examiner—William P. Neuder

[57] ABSTRACT

A cutterbar includes a plurality of modules connected in end-to-end relationship with each other, the modules respectively including identical cast gear housing sections which cooperate to form a gear housing in which is located a spur gear drive train. Each module includes a removably mounted cutting unit, with the cutting units having blade-carrying discs and being arranged such that the discs are indexed 90° relative to each other and in counter rotating pairs, when an even number of units are used to form a cutterbar but being arranged such that the leftmost and adjacent blade-carrying discs rotate in the same direction when an odd number of modules are used. The construction of the leftmost module is such that the axis of rotation of the drive shaft of the cutting unit thereof is located rearwardly of a line of centers passing through drive shafts of the cutting units of the remaining modules whereby adequate clearance is provided between the paths of rotation of the cutting blades of the leftmost and adjacent cutting units. A unitary skid pan extends beneath and is connected to each of the modules and serves to both protect the housing sections from damage during operation and to support the modules during assembly and repair of the cutterbar.

14 Claims, 5 Drawing Sheets

MODULAR CUTTERBAR FOR ROTARY MOWER

BACKGROUND OF THE INVENTION

The present invention relates to crop harvesting machines and more particularly relates to a modular cutterbar for a rotary mower.

Typically, rotary mower cutterbars include a fluid tight gear housing which contains a gear train for driving cutting units spaced along the length of the cutterbar. These cutterbars are usually driven from below. Consequently, it is desirable to keep the vertical space required for the drive train to a minimum in order for the cutterbar to be operated for disposing the cutting units in close proximity to the ground so as to result in a low height of cut. The gear train which best accomplishes this desired result is one made up of a plurality of spur gears.

U.S. Pat. No. 4,468,916, granted to Vissers et al on Sept. 4, 1984, discloses a cutterbar structure made up of a plurality of like intermediate gear housing sections that are bolted together in end-to-end relationship with one another and of right and left end gear housing sections which are respectively coupled to the right and left ends respectively of the assembled intermediate sections. The patent discloses a first embodiment of the gear housing sections wherein an integral portion of one end of each of the end sections and of the opposite ends of each the intermediate sections is defined by semi-cylindrical surfaces adapted for receiving a pair of bearings for rotatably supporting a cutting unit drive shaft, the latter having a pinion gear formed on the lower end thereof. Located in each of the intermediate sections on the centerline passing through the semi-cylindrical end surfaces are a pair of idler shaft mounting structures defined by first and second sets of upper and lower axially aligned holes respectively located in top and bottom walls of the sections. An idler gear mounting shaft is pressed into each set of axially aligned holes and rotatably mounted on each shaft by means of a respective bearing is an idler gear. Thus, when a plurality of the sections are assembled together for forming a cutterbar, the pinion and idler gears are in series and operate such that adjacent pairs of the cutting units will rotate in opposite directions.

This patented cutterbar has the disadvantages that:

1. Only cutterbars having an even number of cutting units can be assembled thus limiting the possible lengths of cutterbars which can be made.

2. The one end face of each of the right and left hand gear housing sections and the two end faces of each of the intermediate sections are relatively complex.

3. The end gear housing sections are of a different construction than the intermediate sections which results in an increase in the cost of the manufacture of the cutterbars.

4. Servicing or replacement of the bearings associated with the cutting unit drive shaft requires the cutterbar to be disassembled to retrieve the failed part which is not desirable since such disassembly would require that the gear lubricant first be drained from the cutterbar; and such disassembly might require that a hoist or like machinery be employed to handle relatively heavy assemblages of housing sections and gears.

5. The assembly of the cutterbar is complicated by the fact that the drive shaft and associated bearings must be mounted in place during the securing together of adjacent gear housing sections and that fixtures must be provided to hold one section in place while another is assembled to it.

SUMMARY OF THE INVENTION

According to the present invention there is provided an improved modular cutterbar which overcomes the various disadvantages associated with the above-described cutterbar.

An object of the invention is to provide a modular cutterbar having a plurality of identical gear housing sections connected together in either even or odd numbers for forming a gear housing containing a spur gear train for driving either an even or an odd number of cutting units.

Yet another object of the invention is to provide a modular cutterbar wherein each gear housing section includes opposite ends which are of a simple planar construction merely requiring a sealant and/or a gasket to be placed between adjacent modules when assembling them together.

Still another object of the invention is to provide a modular cutterbar wherein the gear housing sections that make up the cutterbar may be assembled before it is necessary to assemble the cutting units to the cutterbar.

Another object of the invention is to provide a modular cutterbar including a one-piece skid plate which extends full-width below the assembled modules and which serves as a fixture for holding gear housing sections in place during the assembly process.

These and other objects are accomplished by a modular cutterbar structure which includes a plurality of identical gear housing sections having opposite planar ends with central ones of the sections being bolted in end-to-end relationship and with the right and left ends respectively of the right-and left-most sections being closed by right and left end caps. The gear housing sections and end caps cooperate to define a housing in which is located a series-parallel spur gear train comprising idler gears arranged in series in a rearward part of the housing and pinion gears mounted in a central forward part of the housing. With the exception of the right- and left-most housing sections which respectively contain only right and left idler gears, each of the sections contains right and left idler gears respectively mounted therein through means of right and left stub shafts inserted into right and left circular openings provided in the top wall of the section and into right and left cylindrical receptacles formed integrally on the bottom wall of the section in axial alignment with the circular openings. The pinion gears are each formed on the bottom of a cutting unit drive shaft which is rotatably mounted within a bearing housing that is releasably mounted to the top wall of the gear housing section so that the pinion meshes with one or the other of the idlers carried by the section depending on the direction of rotation desired. Extending the length of the assembled gear housing sections and bolted to the bottom and lower rear thereof is a skid plate which also serves as a fixture for holding the sections during the assembly of a cutterbar or during replacement a damaged section.

DESCRIPTION OF THE PREFERRED EMBODIMENT

Figure 1:
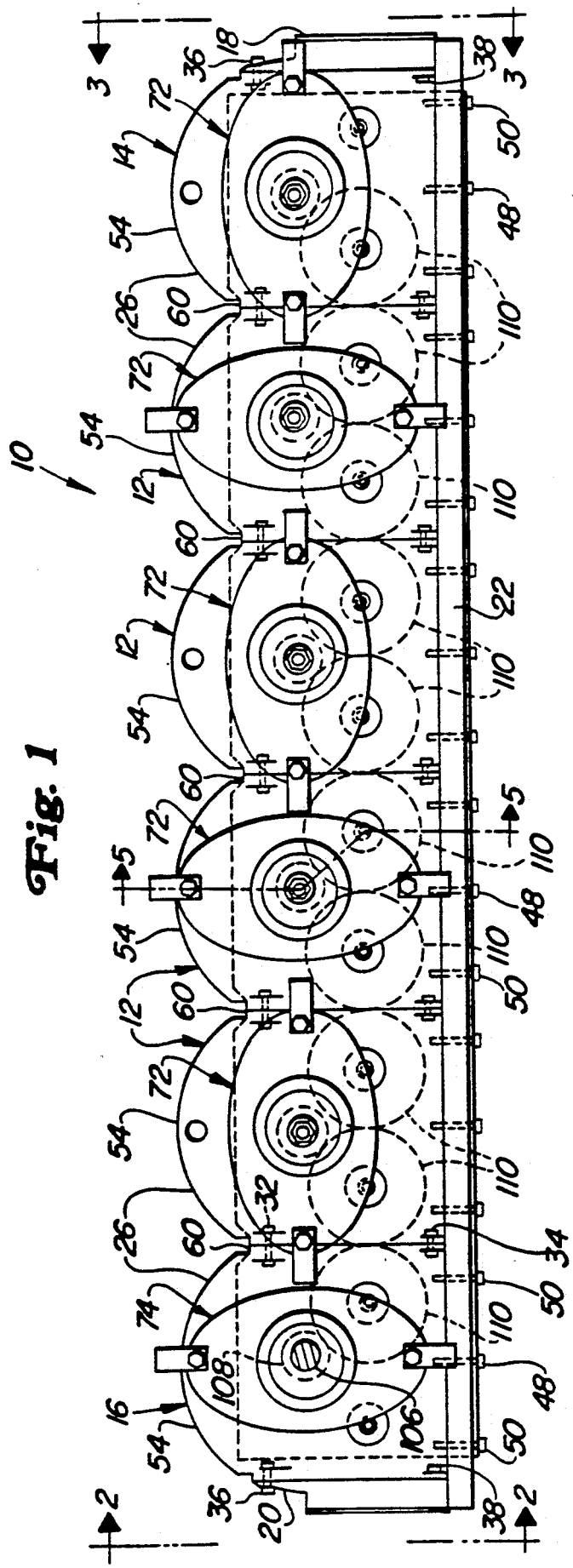
FIG. 1 is a top plan view of a cutterbar constructed in accordance with the present invention.
Figure 2:
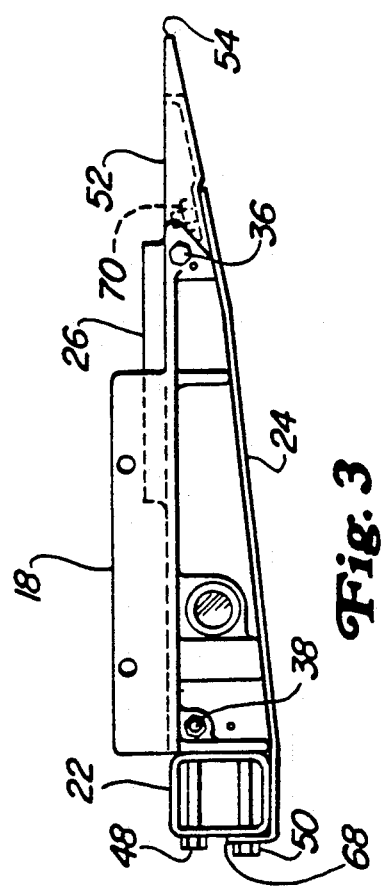
FIG. 2 is an enlarged end view taken along line 2—2 of FIG. 1 but with the cutting units removed.
Figure 3:
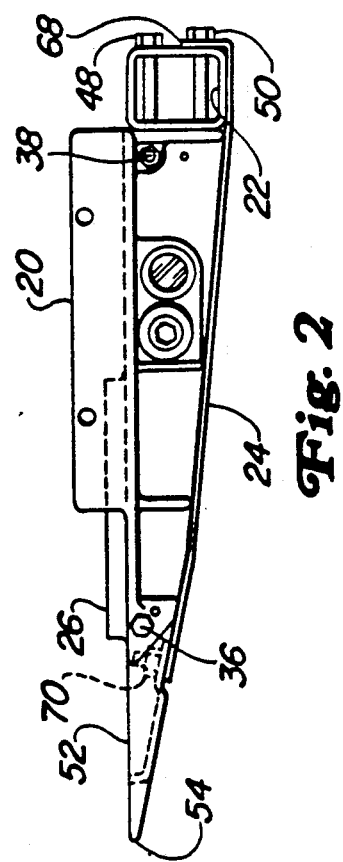
FIG. 3 is an enlarged end view taken along line 3—3 of FIG. 1 but with the cutting units removed.
Figure 4:
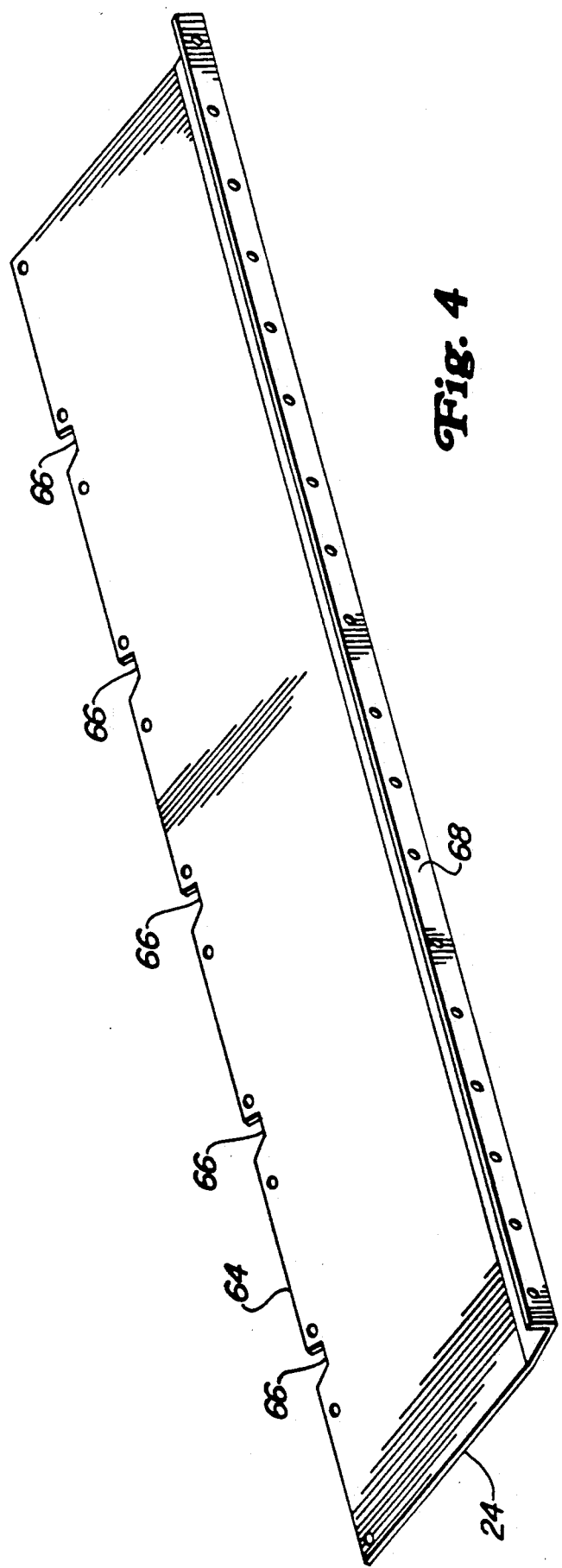
FIG. 4 is a perspective view of the skid plate.
Figure 5:
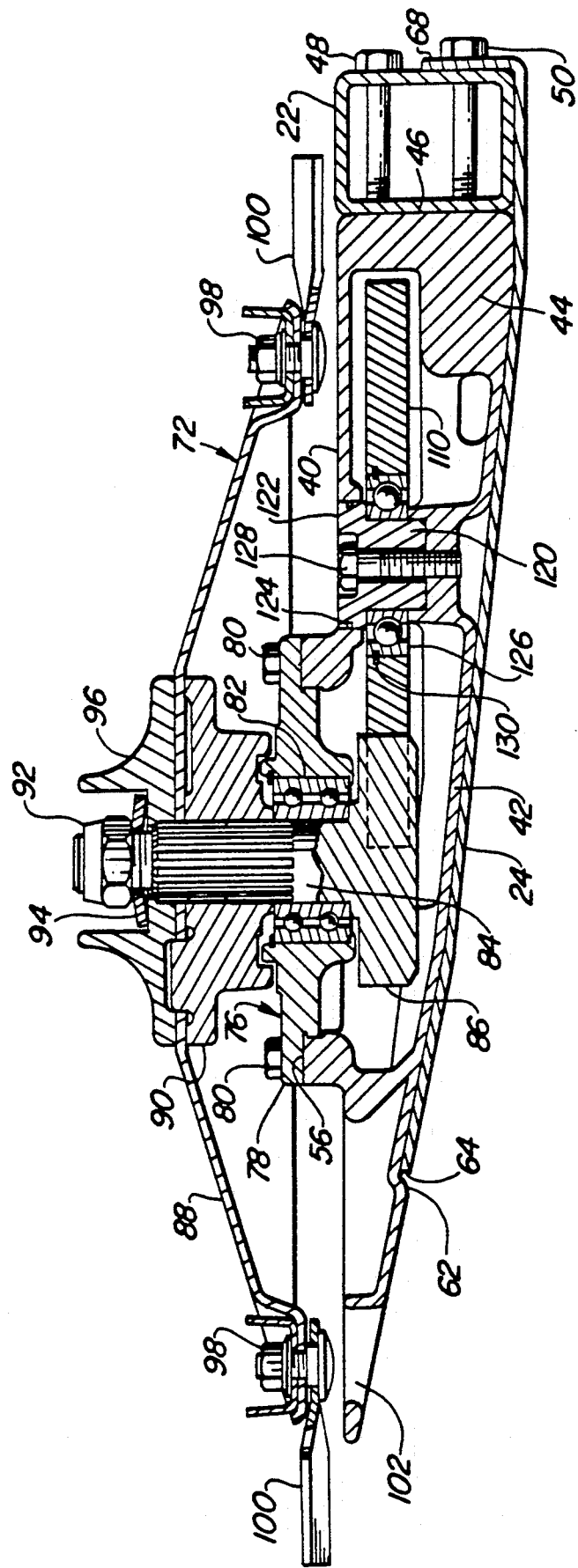
FIG. 5 is a vertical sectional view of one of the cutterbar modules taken along line 5—5 of FIG. 1.
Figure 6:
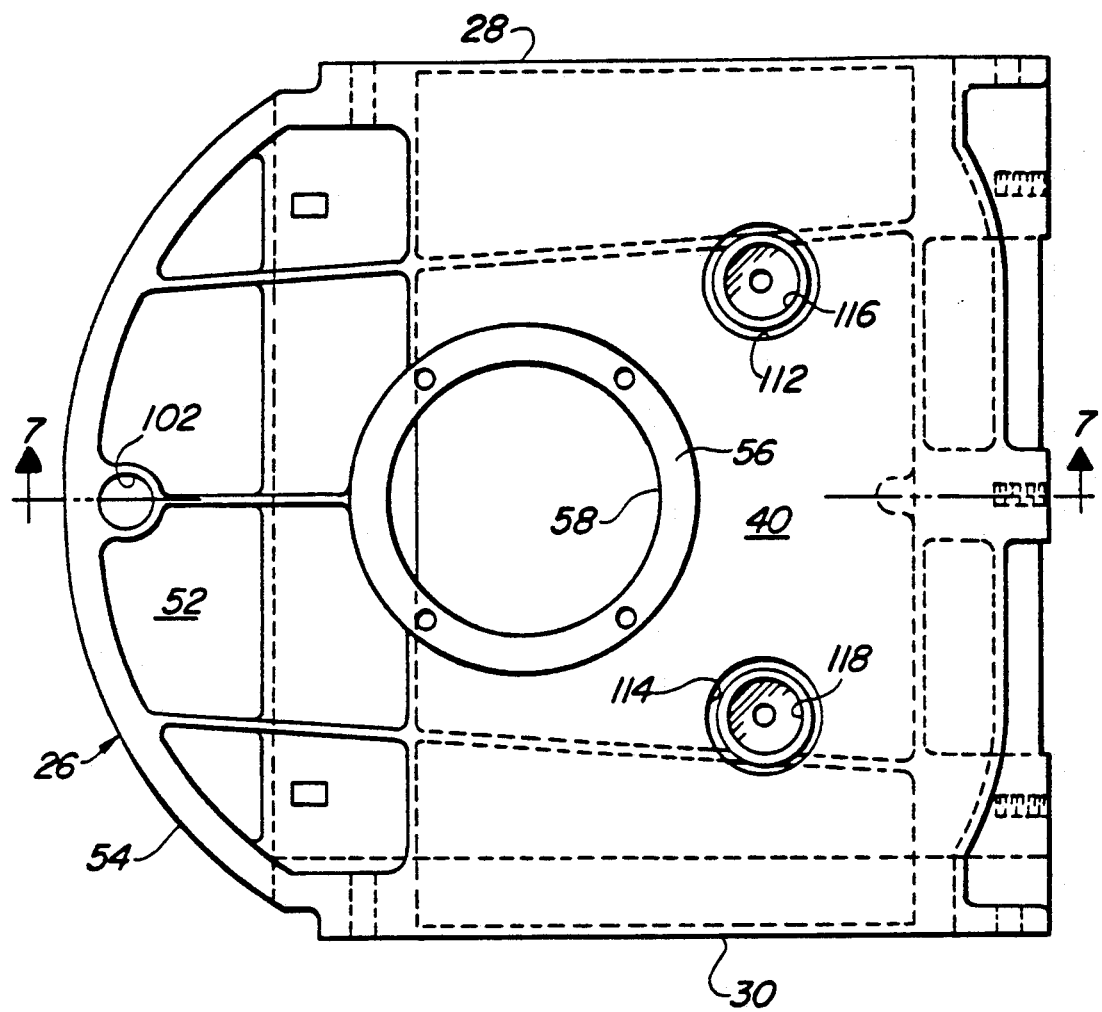
FIG. 6 is a top plan view of one of the gear housing sections.
Figure 7:
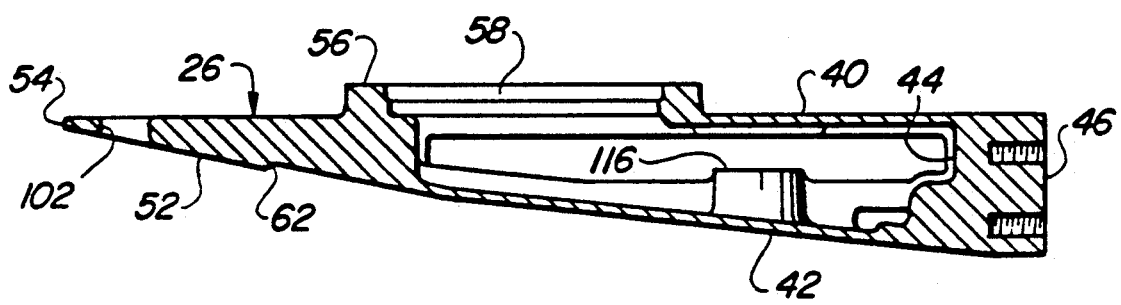
FIG. 7 is a vertical sectional view taken along line 7—7 of FIG. 6.

Preliminarily, it should be noted that terms such as "right", "left", "forward", "front", "rearward" and "rear" as used herein are taken with reference to an observer standing behind the structure and facing in the normal direction of forward movement of the structure during the operation thereof.

Referring now to FIGS. 1-4 of the drawings, there is shown a rotary or disc mower cutterbar 10 formed of identical intermediate modules 12, a right end module 14, a left end module 16, a right end cap 18, a left end cap 20, a stiffener beam 22, of rectangular cross section, extending lengthwise behind and secured to the rear of each of the modules 12, 14 and 16 and a protective skid plate or pan 24 extending lengthwise beneath and secured to each of the modules.

Referring now also to FIGS. 5-8, it can be seen that each of the modules 12, 14 and 16 includes a cast gear housing section 26 having right and left, fore-and-aft extending, vertical planar end faces 28 and 30, respectively, with the gear housing sections being secured in end-to-end relationship to each other by a front nut and bolt assembly 32 and a rear nut and bolt assembly 34, while the right and left end caps 18 and 20 are respectively secured to the right and left end faces of the gear housing sections of the right and left end modules 14 and 16 by means of front and rear cap screws 36 and 38, respectively. An appropriate seal-forming substance or a sealant for use with a seal (not shown) would be applied to portions of the respective interfaces of the housing sections with each other and with the end caps. Each gear housing section 26 is wedge-shaped in vertical cross section and, as viewed in FIG. 5, includes a substantially horizontal top wall 40 and a bottom wall 42 which converge forwardly from an upright rear wall 44. The rear wall 44 has a planar vertical rear surface 46 and it is against this surface of each of the housing sections that the stiffener beam 22 is bolted by means of an upper centrally located cap screw 48, and three lower cap screws 50. As can be seen in FIGS. 1-3 and 6, the top and bottom walls 40 and 42 of each housing section 26 merge together to form a wedge-shaped cutting disc guard 52 having a forward end 54 formed substantially arcuately about a vertical axis of a raised, annular bearing housing mounting surface 56 circumscribing a cutting unit mounting opening 58 formed in a central forward location of the top wall 26 of the housing section. Thus, the disc guards 52 of the assembled housing sections 26 form a scalloped forward edge of the cutterbar 10, it being noted that the forward ends 54 of adjacent housing sections are separated from each other such as to form a substantially square, forwardly opening notch or recess 60 just forwardly of the joined faces 28 and 30. Further, it can be seen that the portion of the disc guard 52 of each housing section 26 which includes the forward end 54 has a bottom surface which is offset downwardly, as at 62, from the remainder of a bottom surface of the housing section. The skid plate 24 covers all except the downwardly offset portion of the bottom surface of the housing section, with a forward edge 64 of the skid plate being straight, except for notches 66 which correspond to and are located at the recesses 60. The skid plate 24 has a vertical rear flange 68 which is located against a rear wall of the stiffener beam 22. A pair of laterally spaced forward bolt and nut assemblies 70 secure the skid plate 24 to each of the blade guards 52 while the three cap screws 50 secure the flange 66 in place against the beam 22. Thus, it will be appreciated that the downward offset 62 of the knife guard 52 serves to protect the forward end of the skid plate 24 from catching on obstructions during operation.

The intermediate modules 12 and the right end module 14 each include an identical cutting unit 72 while the left end module 16 includes a cutting unit 74 that differs slightly from the units 72 as set forth below. Specifically, as can best be seen in FIGS. 1 and 5, each cutting unit 72 includes a bearing housing 76 having an annular mounting flange 78, removably mounted in sealed engagement with the mounting surface 56 by cap screws 80, and having a bearing assembly 82 eccentrically supported therein relative to the flange for a purpose described below. Mounted in the bearing assembly 82 is a cutting unit drive shaft 84 having a pinion gear 86 formed integrally with the bottom end thereof. Each cutting unit 72 further includes a disc 88, which is oval-shaped in plan view and upwardly convex. The disc 88 has a central hub 90 splined to the shaft 84 and held in place by a nut 92 threaded on an upper end of the shaft 84 and acting through a spring washer 94 to urge a clamping member 96 against the disc. Secured to diametrically opposite locations along the longer dimension of each of the discs 88, as by nut and bolt assemblies 98, are a pair of cutting blades or knives 100 which are disposed to sweep a path that is located just beyond the substantially arcuate end 54 of the blade guard 52 of the gear housing to which the cutting unit is mounted. It is here noted that a vertical opening 102 is provided in the blade guard 52 so that the nut and bolt assemblies 98 can be aligned therewith and accessed by a tool for aiding in their disassembly whereby the blades 100 may be replaced without requiring the disc 88 to be removed from the drive shaft 84.

The left cutting unit 74 (FIG. 8) differs from the cutting units 72 in that it includes a bearing housing 104 that has a larger bearing assembly (not shown) contained therein and includes a cutting unit drive shaft 106 that serves as the drive input to the drive train contained in the cutterbar, the drive shaft 106 having a pinion gear 108, similar to the pinion gears 86, formed integrally with the bottom end thereof. Further, as is described in detail below, the bearing assembly is held in a different eccentric location relative to an annular mounting flange of the bearing housing 104 than is the eccentric location of the bearing housings 76 relative to their respective mounting flanges 78.

Provided for transmitting drive torque from the pinion gear 108 to the pinion gears 86, are a plurality of series-arranged idler gears 110. Each of the gear housing sections 26 includes right and left, transversely spaced, circular openings 112 and 114 loCated in the top wall 40 rearwardly of and equidistant from the cutting unit mounting opening 58. Formed integrally with the inner surface of the bottom wall 42 in axial alignment with the openings 112 and 114 are cylindrical, upwardly opening receptacles 116 and 118. Received in each of the receptacles 116 and 118 is a lower end portion of an idler stub shaft 120, the latter having an enlarged upper end 122 tightly received in a respective one of the openings 112 and 114 and containing a circumferential groove containing an o-ring seal 124 for preventing fluid leakage past the head. Mounted on all of the stub shafts 120 except for those respectively received in the right receptacle 116 of the housing section of the right end module 14 and in the left receptacle 118 of the housing section of the left end module 16 are respective bearings 126 that are captured between the head of a respective stub shaft and the top of a respective receptacle through the action of a cap screw 128 received axially through the stub shaft and threaded into a bore in the bottom wall 42. The bearings 126 are each secured to the center of a respective one of the idler gears 110 by means of a snap ring 130.

As can best be seen in FIG. 1, the bearing housings of the various modules 12, 14 and 16 are located so as to dispose the pinion gears associated therewith to mesh with those idler gears 110 which cause the drive shafts of adjacent pairs of the cutting units to counter rotate, this operation being that generally desired when an even number of cutting units are used. It can be seen that the discs 88 of adjacent cutting units are rotated 90° relative to each other whereby the cutting blades 100 are kept from interfering with one another.

Figure 8:
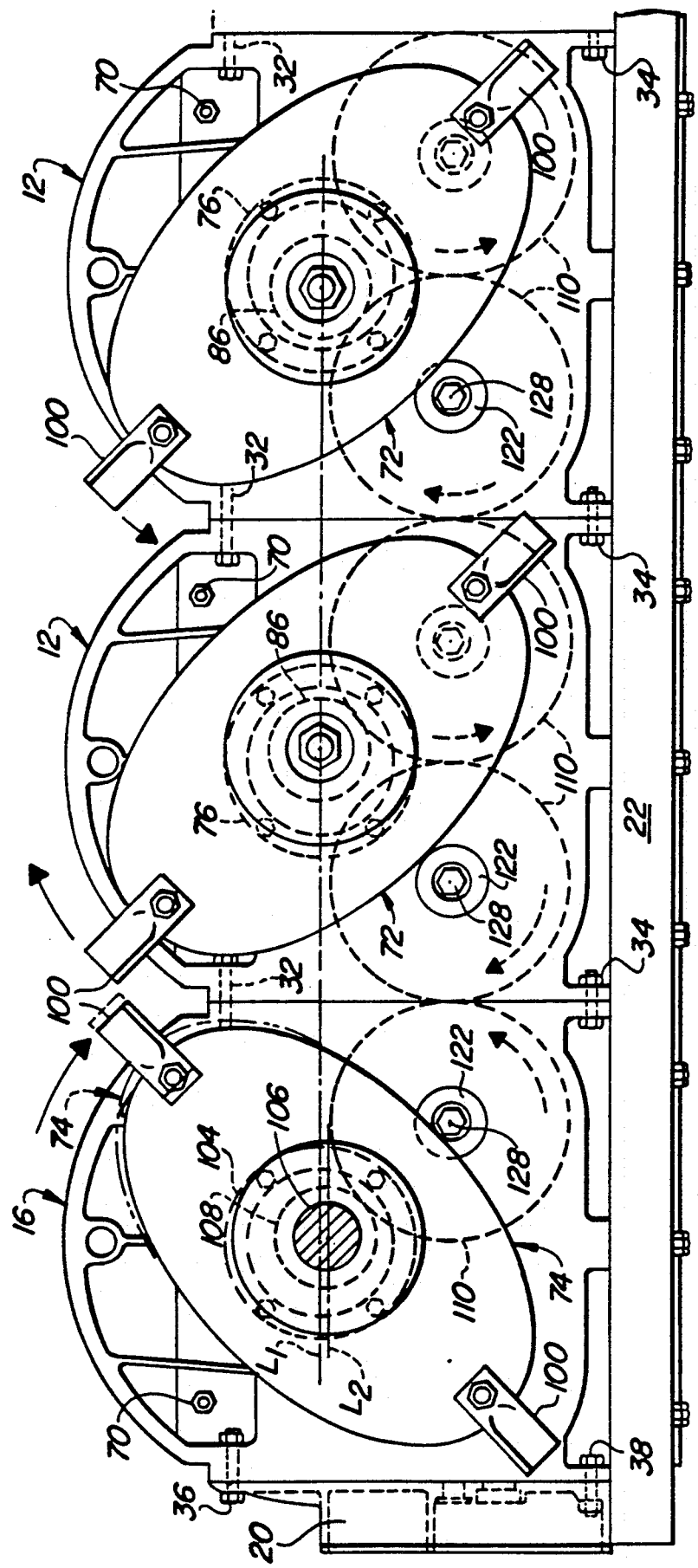
FIG. 8 is a schematic top plan view showing the positioning of the bearing housing for the drive shaft of the left-most cutting unit which results in adequate cutting unit clearance for the situation where the adjacent cutting unit rotates in the same direction as the left-most cutting units.

Referring now to FIG. 8, there is shown the arrangement of the cutting unit of the left end module 16 and the next two intermediate modules 12 as they would appear when an uneven number of modules are used to make up a cutterbar 10. Specifically, it can be seen that the bearing housings 104 of the intermediate modules are rotated 180° from their positions shown in FIG. 1 so that they each mesh with a different one of the pairs of pinion gears 86 of the respective modules whereby the respective pinion gears 86 counter rotate. Thus, the respective drive shafts of the cutting units of the left end module 16 and of the adjacent intermediate module rotate in the same direction, as is usually desired when an odd number of modules is used. If the location of the eccentricity of the bearing housing 104, relative to the placement of the cap screws for mounting the same, were the same as that of the bearing housings 76, the axis of rotation of the shaft 106 would lie along the line L1 and the tip of one of the knives 100 of the cutting unit 74 would pass closely adjacent to one of the knives 100 of the adjacent cutting unit 72 as shown in dashed lines. In the event that one or the other of these closely passing blades 100 were to deflect to a position other than that shown, the blades could interfere with each other. In order to ensure that such interference does not happen, the eccentricity of the bearing housing 104 is such that the drive shaft 106 is located rearwardly of the center line L1. This results in the blades 100 of the cutting unit 74 tracing a path, as shown in solid lines, that results in an increase in the distance between the closely passing blades of the adjacent cutting units as can be seen by comparing the dashed and solid line positions of the blade 100 of the cutting unit 74.

The skid plate or pan 24 serves a purpose during the manufacturing process in that it is used as a fixture for supporting partially or wholly assembled modules while they are being connected one to the other for making up the cutterbar 10. Specifically, in the assembly of each cutterbar 10, a pair of idler gears 110 is mounted in each gear housing section 26 which is to form part of an intermediate module, while only one idler gear 110 is respectively mounted in those housing sections 26 which are to form the right and left modules 14 and 16, respectively. The pan or plate 24 is normally supported one a bench or table and the housing sections 26 are arranged in order along the pan, it being noted that the latter has a length corresponding to the length of the cutterbar to be made. Sealant for gaskets, or a gasket-forming substance is applied to an appropriate portion of the housing section end faces 28 and 30. The housing sections are then connected together using the front and rear bolt assemblies 32 and 34, respectively. Each of the housing sections 26 of the interconnected modules is then loosely assembled to the pan by inserting the bolts of the pair of bolt and nut assemblies 70 through the front of the pan and the disc guard 52 of the housing section and loosely threading a nut on the end of each bolt. Next, the cutting units 72 are respectively mounted to all of the gear housing sections 26 except for the leftmost section and the cutting unit 74 is mounted to this section. A hoist cradle is then engaged with this partially assembled cutterbar at a central location between the ends thereof and the assembly is hoisted into place in a framework (not shown) of a mower conditioner, this framework including the stiffener beam 22. The stiffener beam 22 is then secured to each of the gear housing sections 26 by means of the upper cap screw 48 and the lower pair of cap screws 50, the latter being used also to secure the upright flange 68 of the skid plate 24 against the rear side of the stiffener beam 22.

In addition to serving as a support for components during the assembly of the cutterbar, the skid plate 24 likewise serves as a support for remaining components of the cutterbar when the latter is partially disassembled in order to remove damaged gear housing sections 26 and the like.

During operation, the skid plate 24 serves as a sacrificial piece of material which protects the gear housing from wear or damage as may result from the housing contacting the ground and/or engaging obstacles.

We claim:

1. In a cutterbar for a rotary mower including right end, left end and intermediate modules connected together in end-to-end relationship to each other with each module including a cutting unit comprising a drive shaft having a pinion gear fixed to the lower end thereof, the improvement comprising: said modules respectively including identical gear housing sections; each housing section having transversely spaced substantially planar, fore-and-aft extending vertical end faces, with the cutting unit being located substantially centrally therebetween and with adjacent housing sections being releasably secured together with adjacent ones of the end faces thereof being in engagement with each other; the respective housing sections of each of the right and left modules having at least one spur-type idler gear mounted therein in mesh with the respective pinion gear thereof; and the respective housing sections of the intermediate modules each having two idler gears mounted therein with at least one of the idler gears being meshed with the pinion gear thereof.

2. The cutterbar defined in claim 1 wherein the idler gears are located along a first line of centers extending parallel to a second line of centers extending lengthwise of the cutterbar and through the centers of at least the axes of rotation of all of the pinion gears of the right end and intermediate modules.

3. The cutterbar defined in claim 2 wherein the idler gears of the cutterbar are meshed with each other such as to form a series arrangement; and the pinion gears respectively of the intermediate modules being meshed with one or the other of the idler gears of the associated intermediate module.

4. The cutterbar defined in claim 3 wherein the cutterbar is provided with an odd number of intermediate modules; the pinion gear of said left end module being located for rotation about an axis located on a third line of centers extending parallel to and spaced closely behind the second line of centers; and the pinion gear of the intermediate module which is adjacent to the left end module being meshed with that one of the two idler gears of such intermediate module that results in the pinion gear rotating in the same direction as the pinion gear of the cutting unit of the left end module, the placement of the axis of rotation of the pinion gear of the cutting unit of the left end module on the third line of centers resulting in cutting blades of such cutting unit tracing a non-interfering path relative to a path traced by the cutting blades of the cutting unit of the intermediate module which is adjacent to the left end module.

5. In a cutterbar including a plurality of modules releasably connected together in end-to-end relationship with one another and defining a fluid-tight gear housing containing a drive train for driving a pinion gear of a cutting unit forming a portion of each module, the improvement comprising: each of said modules including a gear housing section; and a protective skid pan extending lengthwise of the cutterbar beneath each of the modules and being releasably connected to each gear housing section, whereby during assembly of the cutterbar the skid pan may serve as a fixture for holding at least the gear housing section of a given module in place while an adjacent gear housing section is being assembled to the skid pan.

6. The cutterbar defined in claim 5 wherein said gear housing sections each include a forward end portion defining a disc guard which is formed substantially arcuately about an axis of rotation of the pinion gear of the cutting unit associated with the housing section; said disc guard being offset downwardly relative to a remaining portion of a bottom surface of the housing section; and said skid pan covering said remaining portion of each housing section and having a forward edge terminating at the downwardly offset disc guard whereby the disc guard prevents the forward edge of the pan from being engaged and bent down by an obstruction.

7. The cutterbar defined in claim 6 wherein a stiffener beam extends lengthwise of the cutterbar and is secured to a rear wall of each housing section, and said skid plate including a upwardly extending flange shaped complimentary to and being secured against said stiffener beam.

8. The cutterbar defined in claim 7 wherein said stiffener beam is rectangular in cross section and the rear wall of each housing section defines a planar, upright wall against which one wall of the stiffener beam is engaged.

9. In a cutterbar for a rotary mower including a gear housing having a plurality of cutting units spaced therealong, each cutting unit including a cutting disc carrying a pair of blades at diametrically opposite positions with each disc being rotatably secured to an upright drive shaft, and the housing containing a spur gear train including a plurality of idler gears arranged for driving a plurality of pinion gears respectively joined to lower ends of the drive shafts with the latter being located on respective vertical axes located along a first line of centers extending lengthwise of the cutterbar and parallel to a second line of centers along which the respective axes of rotation of the idler gears are located, the improvement comprising: the gear housing being formed from a plurality of identical gear housing sections which each include vertical planar, fore-and-aft extending, right and left end surfaces, with the right end surface of a given gear housing section being connected in abutting relationship to the left end surface of an adjacent gear housing section; and right and left end caps being respectively secured to the right end surface of a leftmost one of the gear housing sections and to the right end surface of a rightmost one of the gear housing sections.

10. The cutterbar defined in claim 9 wherein a pair of the idler gears is mounted in each of the gear housing sections except for the right- and leftmost gear housing sections in each of which only one idler gear is mounted.

11. The cutterbar defined in claim 10 wherein the plurality of idler gears are meshed to each other such as to be arranged in series and the pinion gear of each housing section being meshed with only one of the idler gears carried by that housing section.

12. The cutterbar defined in claim 11 wherein the pinion gear of each housing section is joined to a lower end of a drive shaft rotatably mounted within a bearing housing that is, in turn, removably mounted to a top wall of the housing section.

13. The cutterbar defined in claim 12 wherein at least those bearing housings associated with all of the gear housing sections, except for the leftmost gear housing section, are identical.

14. The cutterbar defined in claim 13 wherein the pinion gears are meshed with certain ones of the idler gears for causing adjacent pairs of the cutting discs, as considered when proceeding from the right end toward the left end of the cutterbar, to counter rotate; said cutterbar including an odd number of cutting units; a top wall of each of the housing sections containing a circular opening located centrally between said left and right end surfaces and bounded by an annular mounting face; each of the bearing housings having an annular mounting flange mounted against the annular mounting face of one of the housing sections; the bearing housings each including means disposing one of the drive shafts therein in eccentric relationship to the annular mounting flange to thereby dispose the drive shaft along an axis which is eccentric to the circular opening in the housing section for the purpose of permitting the pinion gear of all of the cutting units, except for the right- and leftmost cutting units, to be meshed with a different one of the idler gears carried by respective housing sections by repositioning the bearing housing carrying the pinion gear; the bearing housing of the leftmost cutting unit being constructed such that the eccentric mounting for the drive shaft carried by such bearing housing differs from that for the drive shafts associated with the remaining cutting units with such different eccentric mounting resulting in the drive shaft of the leftmost cutting unit being positioned for rotation about an axis which is spaced slightly rearwardly of the first line of centers; the pinion gear of the leftmost cutting unit rotating in the same direction as that of the pinion gear of the adjacent cutting unit; and the positioning of the idler gear of the leftmost cutting unit result in the blades carried by the discs of the leftmost and adjacent cutting units tracing non-interfering paths.

* * * * *

UNITED STATES PATENT AND TRADEMARK OFFICE
CERTIFICATE OF CORRECTION

PATENT NO. : 5,012,635

DATED : 7 May 1991

INVENTOR(S) : James C. Walters et al.

It is certified that error appears in the above-identified patent and that said Letters Patent is hereby corrected as shown below:

Column 6, line 60, after "other;" insert -- said pinion gear being a spur gear; -- .

Signed and Sealed this

Twentieth Day of October, 1992

Attest:

DOUGLAS B. COMER

Attesting Officer

Acting Commissioner of Patents and Trademarks